United States Patent
Cong et al.

(10) Patent No.: US 11,965,773 B2
(45) Date of Patent: Apr. 23, 2024

(54) TORSION BALANCE AND METHOD FOR MAKING THE SAME

(71) Applicants: Tsinghua University, Beijing (CN); HON HAI PRECISION INDUSTRY CO., LTD., New Taipei (TW)

(72) Inventors: Lin Cong, Beijing (CN); Zi Yuan, Shenzhen (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 651 days.

(21) Appl. No.: 17/147,769

(22) Filed: Jan. 13, 2021

(65) Prior Publication Data

US 2021/0223091 A1    Jul. 22, 2021

(30) Foreign Application Priority Data

Jan. 16, 2020   (CN) .......................... 202010049331.X

(51) Int. Cl.
  *G01G 3/10*     (2006.01)
  *G01G 1/18*     (2006.01)

(52) U.S. Cl.
  CPC ............... *G01G 3/10* (2013.01); *G01G 1/18* (2013.01)

(58) Field of Classification Search
  CPC ... G01G 3/10; G01G 1/18; G01V 7/10; G01L 3/12; G01L 1/24; G01L 3/00; B23K 26/38; B23K 26/0643; B23K 26/702
  USPC ........................................................ 177/196
  See application file for complete search history.

(56) References Cited

U.S. PATENT DOCUMENTS

| | | | | |
|---|---|---|---|---|
| 6,976,395 B2* | 12/2005 | Arndt | ...................... | G01L 11/02 |
| | | | | 73/705 |
| 8,623,258 B2* | 1/2014 | Liu | ...................... | B82Y 40/00 |
| | | | | 977/842 |
| 8,668,896 B2* | 3/2014 | Liu | ...................... | B82Y 40/00 |
| | | | | 423/447.1 |
| 8,794,289 B2* | 8/2014 | Liu | ...................... | B82Y 30/00 |
| | | | | 264/145 |
| 9,567,257 B2* | 2/2017 | Jin | ...................... | C23C 30/00 |
| 9,650,253 B2* | 5/2017 | Wei | ...................... | B82Y 40/00 |
| 10,604,409 B2* | 3/2020 | Wang | ................... | C01B 32/168 |
| 11,650,098 B2* | 5/2023 | Cong | ...................... | G01J 1/56 |
| | | | | 356/445 |
| 2012/0298618 A1* | 11/2012 | Jiang | ..................... | C01B 32/186 |
| | | | | 977/891 |
| 2015/0346398 A1 | 12/2015 | Gorodetsky et al. | | |

FOREIGN PATENT DOCUMENTS

CN    107101760    8/2017

* cited by examiner

*Primary Examiner* — Jacques M Saint Surin
(74) *Attorney, Agent, or Firm* — ScienBiziP, P.C.

(57) ABSTRACT

A torsion balance is provided which includes a twisting wire and a reflector. The twisting wire is a suspended carbon nanotube. The reflector is hung on the twisting wire. The reflector further includes a film, a first reflecting layer, and a second reflecting layer; and the film includes a first surface and a second surface opposite to the first surface, and the first reflecting layer is located on the first surface and the second reflecting layer is located on the second surface.

14 Claims, 5 Drawing Sheets

TORSION BALANCE AND METHOD FOR MAKING THE SAME

CROSS-REFERENCE TO RELATED APPLICATIONS

This application is related to commonly-assigned application entitled, "METHOD AND DEVICE FOR MEASURING LIGHT RADIATION PRESSURE", concurrently filed. The entire contents of which are incorporated herein by reference.

FIELD

The present application relates to the field of precision instruments, and in particular, to a torsion balance.

BACKGROUND

The torsion balance is a precision device with a torsion pendulum structure, which can be used as a tool for measuring small forces and moments. The torsion balance mainly includes a twisting wire and a rotating body with moment of inertia.

At present, the twisting wires of the torsion balances mostly use metal fibers such as tungsten fibers or silica fibers. However, the preparation of these fibers is very complicated, and the diameters of these fibers are usually tens or even hundreds of micrometers, resulting in lower accuracy and sensitivity of the torsion balance. Additionally, the rotating body usually uses a metal block or a metal-plated fused silica block, which has a large mass, a small size, a large moment of inertia, and is difficult to rotate. Using metal blocks or metal-plated fused silica blocks also can reduce the accuracy and sensitivity of the torsion balance.

Therefore, there is room for improvement in the art.

BRIEF DESCRIPTION OF THE DRAWINGS

Implementations of the present technology will now be described, by way of embodiments, with reference to the attached figures, wherein.

DETAILED DESCRIPTION

Figure 1:
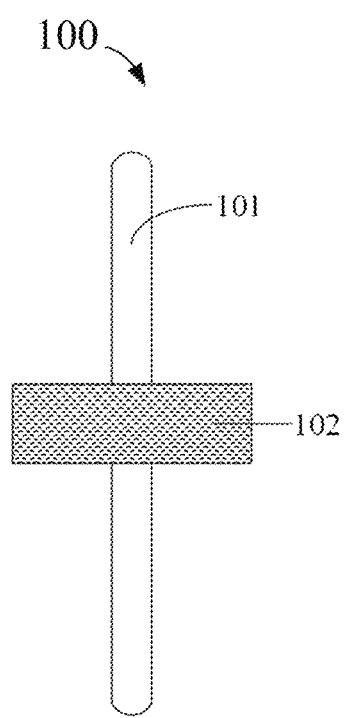
FIG. 1 is a front structural schematic view of a torsion balance according to one embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. The drawings are not necessarily to scale, and the proportions of certain parts may be exaggerated to be better illustrate details and features. The description is not to be considered as limiting the scope of the embodiments described herein.

Several definitions that apply throughout this disclosure will now be presented.

The term "substantially" is defined to be essentially conforming to the particular dimension, shape or another word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 2:
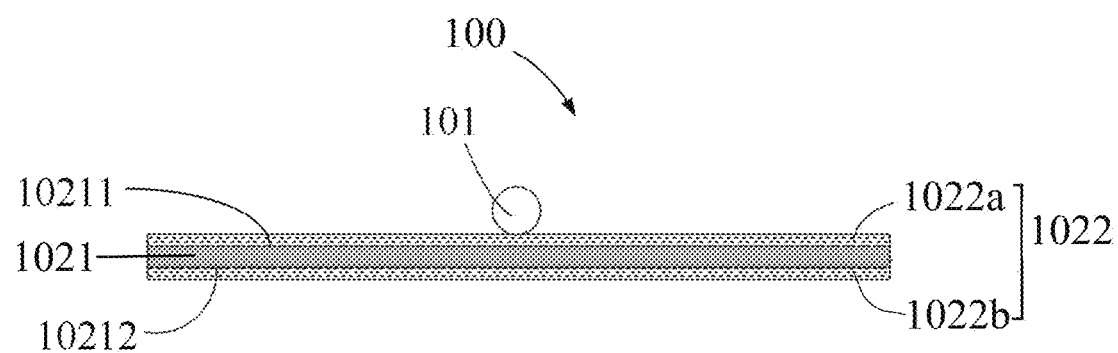
FIG. 2 is a top structural schematic view of a torsion balance according to one embodiment of the present disclosure.
Figure 3:
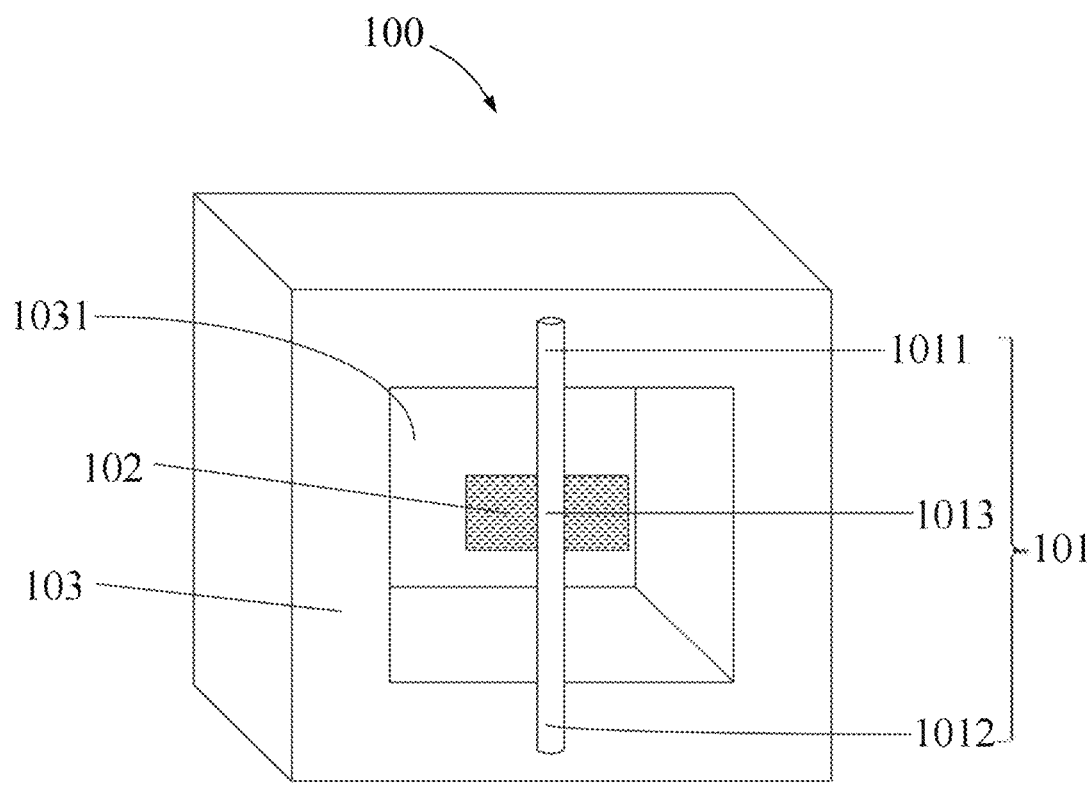
FIG. 3 is a three-dimensional structural schematic view of a torsion balance according to one embodiment of the present disclosure.

Referring to FIG. 1 and FIG. 2, a torsion balance 100 is provided according to one embodiment. The torsion balance 100 is a precision torsion balance, and can be used to measure light radiation pressure. The torsion balance 100 includes a twisting wire and a reflector 102. The twisting wire can be a suspended carbon nanotube 101. The reflector 102 is hung on the carbon nanotube 101. The reflector 102 includes a film 1021, a first reflecting layer 1022a, and a second reflecting layer 1022b. The film 1021 includes at least two layers of two-dimensional materials stacked with each other. The film 1021 has a first surface 10211 and a second surface 10212 opposite to the first surface 10211. The first reflecting layer 1022a is located on the first surface 10211 and the second reflecting layer 1022b is located on the second surface 10212.

The carbon nanotube 101 can be selected from a single-walled carbon nanotube or a multi-walled carbon nanotube, or the carbon nanotube 101 can be prepared by removing the outer wall of a multi-walled carbon nanotube, so that the outer surface of the carbon nanotube can be super clean, which can facilitate the suspension and fixation of the reflector 102 onto the surface of the carbon nanotube 101. The diameter of the carbon nanotube 101 is not limited. The smaller the diameter of the carbon nanotube 101, the higher the sensitivity and accuracy of the torsion balance 100. In one embodiment, the diameter of the carbon nanotube 101 is less than 10 nanometers. The suspended length of the carbon nanotube 101 is not limited. The longer the suspended lengths of the carbon nanotube 101, the higher the accuracy of the torsion balance 100. In one embodiment, the carbon nanotube 101 is a single-walled carbon nanotube with a diameter of about 7 nanometers and a suspended length of about 300 micrometers. Since the diameter of a single carbon nanotube is in nanometer scale, using the single carbon nanotube as a twisting wire of the torsion balance 100 can improve the sensitivity and accuracy of the torsion balance 100.

The film 1021 can be a "free-standing" film. The term "free-standing" includes, but is not limited to, a structure that does not have to be supported by a substrate and can sustain the weight of itself when it is hoisted by a portion thereof without any significant damage to its structural integrity. A shape of the film 1021 is not limited, specifically, it can be regular or irregular shape, such as rectangle, circle, or triangle. The film 1021 can be an axisymmetric shaped film, and the carbon nanotube 101 is located on the symmetry axis of the film 1021. In one embodiment, the film 1021 is a rectangle shaped film with a width of about 80 μm and a length of about 120 μm.

The film 1021 includes at least two layers of two-dimensional materials stacked one after another. The two-dimensional material layer has a continuous surface with a certain area. The two-dimensional material can be carbon nanotube film, graphene, boron nitride, molybdenum disulfide, tungsten disulfide or any combination thereof. The types of the two-dimensional materials in the film 1021 can be the same or different. On one hand, increasing the thickness of the first reflecting layer 1022a and/or the second reflecting layer 1022b can make the surface of the reflector 102 flat and then increase the reflectivity of the incident light, especially when the film 1021 only includes carbon nanotube films and the carbon nanotube films include a plurality of micropores. On the other hand, the increase in the thickness of the first reflecting layer 1022a and/or the second reflecting layer 1022b will inevitably reduce the sensitivity and accuracy of the torsion balance 100.

In one embodiment, the carbon nanotube film coexists with other two-dimensional materials, such as graphene, boron nitride, molybdenum disulfide, or tungsten disulfide, and serves as a supporter for the other two-dimensional materials.

The carbon nanotube film includes a plurality of carbon nanotubes combined by van der Waals attractive force therebetween. The carbon nanotubes in the carbon nanotube film can be orderly aligned or disorderly aligned. The disorderly aligned carbon nanotubes are carbon nanotubes arranged along many different directions, such that the number of carbon nanotubes arranged along each different direction can be almost the same (e.g. uniformly disordered); and/or entangled with each other. The orderly aligned carbon nanotubes are carbon nanotubes arranged in a consistently systematic manner, e.g., most of the carbon nanotubes are arranged approximately along a same direction or have two or more sections within each of which the most of the carbon nanotubes are arranged approximately along a same direction (different sections can have different directions). The carbon nanotube film can be a drawn carbon nanotube film, a flocculated carbon nanotube film, or a pressed carbon nanotube film.

In one embodiment, the carbon nanotube layer includes at least one drawn carbon nanotube film. A film can be drawn from a carbon nanotube array, to form a drawn carbon nanotube film. The drawn carbon nanotube film includes a plurality of successive and oriented carbon nanotubes joined end-to-end by van der Waals attractive force therebetween. A plurality of carbon nanotubes in the drawn carbon nanotube film are arranged substantially parallel to a surface of the drawn carbon nanotube film. The drawn carbon nanotube film is a free-standing film. Each drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and combined by van der Waals attractive force therebetween. When the film 1021 includes a plurality of drawn carbon nanotube films stacked one after another, an angle between the aligned directions of the carbon nanotubes in at least two drawn carbon nanotube films can be in a range from about 0 degrees to about 90 degrees.

In another embodiment, the carbon nanotube layer can include at least one pressed carbon nanotube film. The pressed carbon nanotube film can be a free-standing carbon nanotube film. The carbon nanotubes in the pressed carbon nanotube film can be substantially arranged along a same direction or substantially arranged along different directions. The carbon nanotubes in the pressed carbon nanotube film can rest upon each other. Adjacent carbon nanotubes are attracted to each other and combined by van der Waals attractive force. The pressed carbon nanotube film has excellent durability, and can be fashioned into desired shapes with a low risk to the integrity of the pressed carbon nanotube film. An angle between a primary alignment direction of the carbon nanotubes and a surface of the pressed carbon nanotube film is in a range from about 0 degrees to about 15 degrees. The greater the pressure applied, the smaller the angle formed. When the carbon nanotubes in the pressed carbon nanotube film are substantially arranged along different directions, the carbon nanotube structure can be isotropic. When pressed in different directions, the carbon nanotubes are arranged in preferred orientations in different directions. When pressed in the same direction, the carbon nanotubes are arranged in a preferred orientation along a fixed direction. In addition, when the pressing direction is perpendicular to the surface of the carbon nanotube array, the carbon nanotubes can be arranged in disorder.

The area of the pressed carbon nanotube film can be basically the same as the area of the carbon nanotube array. The thickness of the pressed carbon nanotube film is related to the height of the carbon nanotube array and the pressure. It can be understood that the greater the height of the carbon nanotube array, the greater the thickness of the pressed carbon nanotube film; and the smaller the pressure applied, the greater the thickness of the pressed carbon nanotube film.

In another embodiment, the carbon nanotube layer can include at least one flocculated carbon nanotube film formed by a flocculating method. The flocculated carbon nanotube film can include a plurality of long, curved, disordered carbon nanotubes entangled with each other. The length of the carbon nanotube can be greater than 10 micrometers. The carbon nanotubes can be randomly arranged and curved in the flocculated carbon nanotube film. The carbon nanotubes can be substantially uniformly distributed in the flocculated carbon nanotube film. The adjacent carbon nanotubes are acted upon by the van der Waals attractive force therebetween, thereby forming an entangled structure with micropores defined therein. The size of the micropores can be less than 10 micrometers. Due to the carbon nanotubes in the flocculated carbon nanotube film being entangled with each other, the flocculated carbon nanotube film has excellent durability, and can be fashioned into desired shapes with a low risk to the integrity of flocculated carbon nanotube film. The flocculated carbon nanotube film can be a free-standing structure due to the carbon nanotubes being entangled and adhered together by van der Waals attractive force therebetween.

Since the thickness of the single-layer two-dimensional materials is very thin, the thickness of the film 1021 can be greatly reduced, and accordingly the thickness of the reflector 102 of the torsion balance 100 can be reduced, thereby improving the sensitivity and accuracy of the torsion balance 100.

Increasing the number of layers of the two-dimensional material may increase the mass and thickness of the reflector 102, resulting in a larger moment of inertia of the reflector 102, which is unhelpful for improving the sensitivity and accuracy of the torsion balance 100. In addition, the reflector 102 is not easy to be fixed and suspended on the carbon nanotube 101 and may cause the twisting wire of the carbon nanotube 101 to break when there are too many layers of two-dimensional materials. Therefore, the number of layers of the two-dimensional material should not be too many, which can be greater than 2 and less than 10. In one embodiment, the number is greater than 2 and less than 5.

The film 1021 can be a carbon nanotube-graphene composite film, which includes a first drawn carbon nanotube film, a second drawn carbon nanotube film, and a single layered graphene film sandwiched between the first drawn carbon nanotube film and the second drawn carbon nanotube film. An angle between the extending direction of the carbon nanotubes in the first drawn carbon nanotube film and the extending direction of the carbon nanotubes in the second drawn carbon nanotube film can be about 90 degrees. The single layered graphene film is a two-dimensional planar hexagonal dense array structure composed of sp2 hybridized carbon atoms. The single layered graphene film can be prepared by mechanical exfoliation or chemical vapor deposition (CVD). The first drawn carbon nanotube film, the second drawn carbon nanotube film, and the single layered graphene film can be overlapped each other. The term 'overlap' means that when the graphene film is disposed on a surface of the carbon nanotube film, the graphene film can completely cover the carbon nanotube film; and when the carbon nanotube film is disposed on a surface of the graphene film, the carbon nanotube film can completely cover the graphene film as well. Additionally, the carbon atoms of the single layered graphene film can be $sp^3$ hybridized to the carbon atoms of the drawn carbon nanotube film, so that the graphene film is stably fixed to the surface of the carbon nanotube film.

The film 1021 can be selected from carbon nanotubes, graphene or other two-dimensional materials. The torque can be improved by selecting a film 1021 with low density, light weight, and a large surface area, then the sensitivity and accuracy of the torsion balance 100 is improved, so that the torsion balance 100 can be used for measuring micro-force and micro-torque.

The first reflecting layer 1022a is located on the first surface 10211 of the film 1021, and the second reflecting layer 1022b is located on the second surface 10212 of the film 1021. The first reflecting layer 1022a and the second reflecting layer 1022b can be formed by evaporation, sputtering, or the like. The first reflecting layer 1022a and the second reflecting layer 1022b form a reflecting layer 1022. If the reflecting layer 1022 is only formed on one surface of the film 1021, the film 1021 may tend to curl after the reflecting layer 1022 is formed. Therefore, it is necessary to form reflecting layers 1022 on both the first surface 10211 and the second surface 10212.

The first reflecting layer 1022a and the second reflecting layer 1022b can be made of a material having small density and high reflectivity. Specifically, the material of the first reflecting layer 1022a and the second reflecting layer 1022b is metal material, such as aluminum, silver, copper, chromium, platinum, or the like. The metal material can be formed on the surface of the film 1021 by a chemical method such as chemical vapor deposition (CVD), or by a physical method such as vacuum evaporation or magnetron sputtering.

The thickness of the first reflecting layer 1022a and the second reflecting layer 1022b should not be too small or too large. If the thicknesses of the first reflecting layer 1022a and the second reflecting layer 1022b is too small, the reflectivity of the incident laser beam at the reflector 102 will decreases; however, if the thickness of the first reflecting layer 1022a and the second reflecting layer 1022b is too large, the mess of the reflector 102 increases and the sensitivity of the torsion balance 100 decreases. Specifically, the thickness of the first reflecting layer 1022a can be in a range of 5 nm to 20 nm, and the thickness of the second reflecting layer 1022b can be in a range of 5 nm to 20 nm. In one embodiment, both the first reflecting layer 1022a and the second reflecting layer 1022b are aluminum layers with a thickness of about 10 nm.

In one embodiment, the reflecting layer has a smooth surface at molecular level, with which the deflection angle of the film 1021 can be accurately determined, thereby improving the sensitivity and accuracy of the torsion balance 100. The molecular level surface can be achieved by controlling the forming conditions of the reflecting layer.

The film 1021 can be directly contacted with the carbon nanotube 101, or the film 1021 can be contacted with the carbon nanotube 101 through the reflecting layer between the film 1021 and the carbon nanotube 101.

It can be understood that in the process of preparing the torsion balance 100, the thin film 1021 can be firstly fixed to the carbon nanotube 101, and then the reflecting layers are formed on the surface of the thin film 1021. In this method, the carbon nanotube 101 is directly contacted with the film 1021, so that the reflecting layer can coat and fix the carbon nanotube 101 and the film 1021 together. Alternatively, the reflecting layer 1022 can also be formed on the surface of the film 1021 first, and then the film 1021 is suspended and fixed on the carbon nanotube 101, so that the single carbon nanotube 101 is directly contacted with the reflecting layer.

Figure 4:
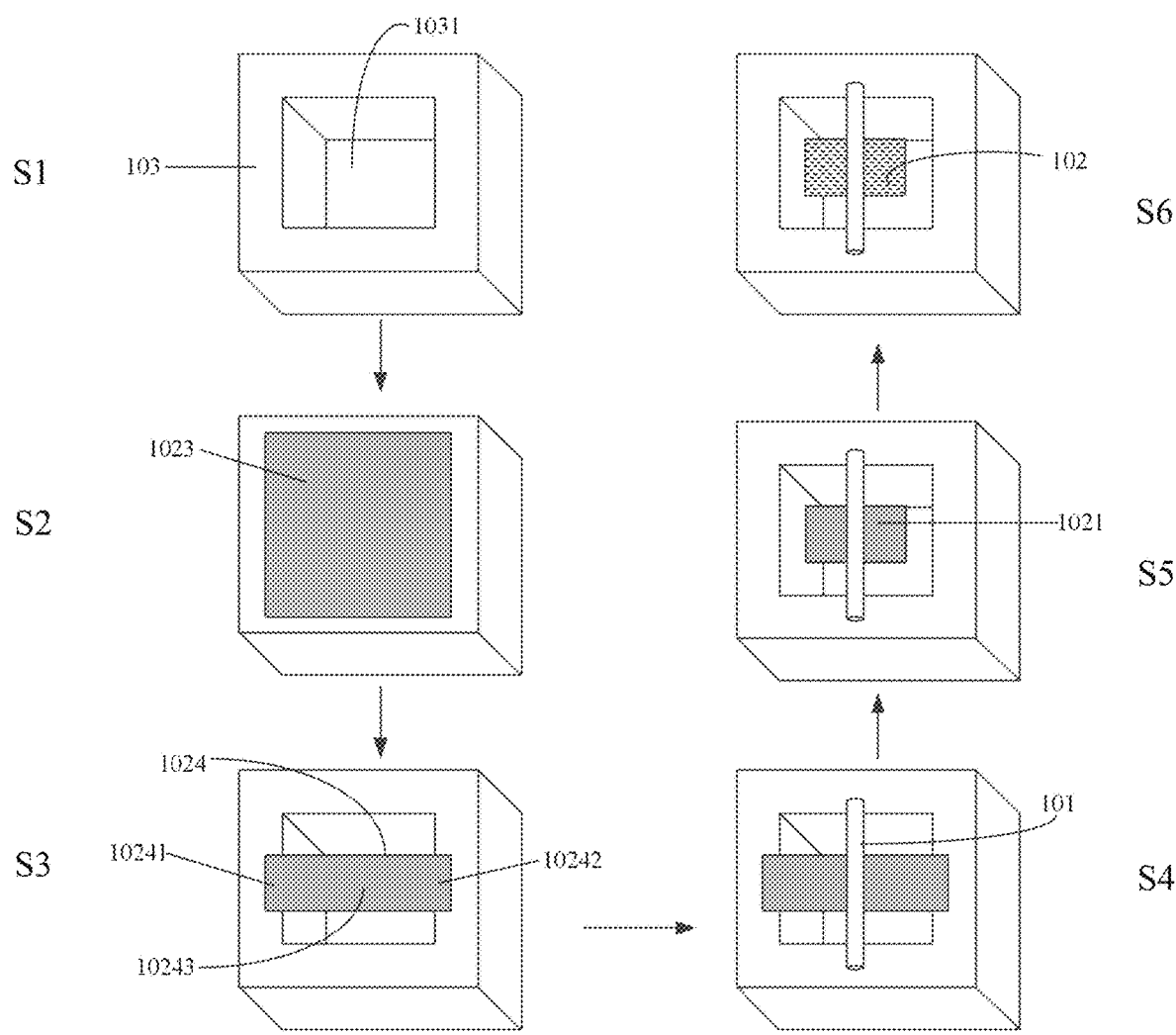
FIG. 4 is flow chart of a method for making the torsion balance according to one embodiment of the present disclosure.

Referring to FIG. 4, the torsion balance 100 can further include a substrate 103 as a fixing element for fixing and supporting the carbon nanotube 101. A space 1031 is defined on a surface of the substrate 103, and the single carbon nanotube 101 can be arranged across the space 1031.

Specifically, the carbon nanotube 101 includes a first end 1011, a second end 1012 opposite to the first end 1011, and a middle portion 1013 located between the first end 1011 and the second end 1012. The first end 1011 and the second end 1012 respectively contact with the surface of the substrate 103 and are fixed on the surface of the substrate 103. The middle portion 1013 of the carbon nanotube 101 is suspended on the space 1031, and the film 1021 hung on the surface of the suspended carbon nanotube.

The material and size of the substrate 103 are not limited and can be selected according to practical application.

The space 1031 should have a certain depth and a certain width, so as to provide sufficient space for the rotation of the film 1021 when the film 1021 rotates around the carbon nanotube 101 under a micro force. The size of the space 1031 is not limited and can be selected according to practical applications. Specifically, the space 1031 can be a through hole or a blind hole. The shape of the through hole or the blind hole is not limited, and it can be a regular hole or an irregular hole, for example, a circular hole, a square hole, or so on.

The film 1021 is fixed on the surface of the carbon nanotube 101. The position of the film 1021 is not limited to the space 1031. For example, the film 1021 can be located inside the space 1031 or outside the space 1031.

In one embodiment, the space 1031 is a through hole formed on the surface of the substrate 103, and the through hole is a square hole with two side lengths of 300 μm.

A method for making the torsion balance 10 is provided in one embodiment of the present disclosure. It should be noted that the making method of the torsion balance 10 is not limited, as long as the film 1021 can be hung on the surface of the carbon nanotube 101. In one embodiment, the single carbon nanotube 101 is fixed on the surface of the substrate 103 first, and then the film 1021 is transferred to the surface of the single carbon nanotube 101. While in another embodiment, a large film is first placed on the surface of the substrate 103, then the carbon nanotubes is transferred to the surface of the large film, and finally the part of the large film which is in contact with the substrate 103 is removed so that the remaining film only hangs on the surface of the suspended carbon nanotube 101. Thus, the torsion balance 10 is formed.

Referring to FIG. 4, a method for making the torsion balance 10 is provided according to one embodiment. The method includes, at least the following blocks:

S1, providing a substrate 103, wherein a space 1031 is defined on a surface of the substrate 103;

S2, forming a first film preform 1023 on the surface of the substrate 103, wherein the first film preform 1023 is suspended on the space 1031 to cover the space 1031, and the first film preform 1023 includes at least two layers of two-dimensional materials stacked with each other;

S3, cutting the first film preform 1023 to obtain a second film preform 1024, wherein the second film preform 1024 includes a first portion 10241, a second portion 10242 opposite to the first portion 10241, and a middle portion 10243 located between the first portion 10241 and the second portion 10242; and the first portion 10241 and the second portion 10242 are fixed on a surface of the substrate 103 and supported by the substrate 103 respectively, the middle portion 10243 is suspended on the space 1031;

S4, providing a carbon nanotube 101 crossed and fixed with the second film preform 1024, wherein the carbon nanotube 101 includes a first end and a second end opposite to the first end, and the first end and the second end are contacted with the surface of the substrate 103 respectively;

S5, cutting the second film preform 1024 to obtain a film 1021 hung on the surface of the carbon nanotube 101; and S6, forming a first reflecting layer 1022a on a first surface 10211 of the film 1021, and forming a second reflecting layer 1022b on a second surface 10212 of the film 1021, wherein the second surface 10211 is opposite to the first surface 10211.

In the step S1, a substrate 103 is provided, a space 1031 is defined on a surface of the substrate 103. In one embodiment, the substrate 103 is a silicon substrate, the space 1031 is a through hole, and the through hole is a square hole with two side lengths of 300 μm.

In the step S2, a first film preform 1023 is formed, the first film preform 1023 covers the space 1031 and is suspended on the space 1031. The first film preform 1023 includes at least two layers of two-dimensional materials stacked with each other.

The first film preform 1023 can be a two-dimensional "free-standing" film. The material of the two-dimensional "free-standing" film can be carbon nanotube, graphene, boron nitride, molybdenum disulfide, tungsten disulfide or any combination thereof. In one embodiment, the first film preform 1023 is a carbon nanotube-graphene composite film, which includes a first drawn carbon nanotube film, a second drawn carbon nanotube film, and a single layered graphene film sandwiched between the first drawn carbon nanotube film and the second drawn carbon nanotube film. An angle between the extending direction of the carbon nanotubes in the first drawn carbon nanotube film and the extending direction of the carbon nanotubes in the second drawn carbon nanotube film can be about 90 degrees.

In one embodiment, the step S2 further includes the following steps:

S21, providing a copper foil with a monolayer graphene grown on a surface of the copper foil;

S22, locating a carbon nanotube film on a surface of the monolayer graphene away from the copper foil;

S23, removing the copper foil by an etching liquid to obtain a first film preform 1023 which includes a carbon nanotube layer and a monolayer graphene layer stacked with each other, and transferring the first film preform 1023 to a cleaning liquid; and S24, picking the first film preform 1023 from the cleaning liquid by the substrate 103, the first film preform 1023 is pasted to a surface of the substrate 103 and the space 1031 of the substrate 103 is covered with the first film preform 1023.

In the step S21, the monolayer graphene can be grown on the surface of the copper foil by chemical vapor deposition.

In the step S22, the carbon nanotube film can be bonded to the monolayer graphene by van der Waals force. Furthermore, an organic solvent can be used to treat the carbon nanotube film and the monolayer graphene, and the surface tension of the organic solvent volatilized can enhance the bonding force between the carbon nanotube film and the monolayer graphene.

In the step S23, the copper foil covered with the carbon nanotube film can be placed on a surface of an etching liquid. After the copper foil has been etched by the etching liquid, the first film preform 1023 formed by a carbon nanotube layer and a monolayer graphene layer stacked with each other can be removed from the etching liquid. Then the first film preform 1023 is placed on a surface of a cleaning liquid to clean the impurities remaining on the surface of the first film preform 1023. The etching liquid can be an acid solution, an alkali solution or a salt solution. The cleaning liquid can be an acid solution or water.

In the step S24, the substrate 103 is immersed in the cleaning liquid and placed under the first film preform 1023. Moving the substrate 103 up gradually then the first film preform 1023 is transferred to the surface of the substrate 103. This method can reduce the wrinkles and cracks on the surface of the first film preform 1023.

The first film preform 1023 includes a peripheral portion and a middle portion surrounded by the peripheral portion. The peripheral portion is in contact with the surface of the substrate 103 and is fixed to the surface of the substrate 103. The middle portion of is suspended on the through hole.

It can be understand that when the first film preform 1023 is made of other two-dimensional materials such as boron nitride, molybdenum disulfide, or tungsten disulfide, the first film preform 1023 can also be prepared by the same method above and transferred to the surface of the substrate 103.

In the step S3, a laser is used to cut the first film preform 1023 to obtain the second film preform 1024. Specifically, the first film preform 1023 is irradiated with a high-power density laser beam. During the laser irradiation, the high energy of the laser beam is absorbed by the first film preform 1023, and the high temperature generated by the laser beam burns off the first film preform 1023 which is located at the laser beam's path. The scanning path of the laser beam can be preset in a computer according to the shape of the second film preform 1024 to be prepared, so as to achieve the purpose of precise control.

After laser cutting, the second film preform 1024 is obtained. The shape of the second film preform 1024 is not limited. Specifically, the shape of the second film preform 1024 can be a rectangle, an ellipse, a parallelogram, a trapezoid, or the like. The second film preform 1024 is arranged across the through hole. The second film preform 1024 includes the first portion 10241, the second portion 10242 opposite to the first portion 10241, and the middle portion 10243 located between the first portion 10241 and the second portion 10242. The first portion 10241 and the second portion 10242 are fixed on the surface of the substrate 103 and supported by the substrate 103 respectively, the middle portion 10243 is suspended on the space 1031.

In one embodiment, the shape of the second film preform 1024 is a rectangle. Two opposite short sides of the second film preform 1024 are arranged on the surface of the substrate 103, and the two opposite long sides are suspended on the space 1031. The length of the second film preform 1024 is the same as the length of the first film preform 1023, and the width of the second film preform 1024 is about 80 micrometers.

In the step S4, the carbon nanotube 101 is provided, and the carbon nanotube 101 is transferred to the surface of the substrate 103. The carbon nanotube 101 is arranged across the space 1031 and crossed and fixed with the second film preform 1024. The carbon nanotube 101 includes the first end and the second end opposite to the first end, the first end and the second end are contacted with the surface of the substrate 103 respectively.

The carbon nanotube 101 can be selected from a single-walled carbon nanotube or a multi-walled carbon nanotube, or the carbon nanotube 101 can be prepared by removing the outer wall of a multi-walled carbon nanotube, so that the outer surface of the carbon nanotube can be super clean, which can facilitate the suspension and fixation of the reflector 102 onto the surface of the carbon nanotube 101.

The carbon nanotube 101 can be prepared by a chemical vapor deposition method, a physical vapor deposition method, or the like. In one embodiment, ultra-long carbon nanotubes are grown by chemical vapor deposition according to the "kite flying mechanism". The method includes: providing a growing substrate and a receiving substrate, the surface of the growing substrate is formed with a monodisperse catalyst, and introducing a carbon source gas. The carbon nanotubes grown by this method float in the direction of the airflow and finally fall on the surface of the receiving substrate.

The method for transferring the carbon nanotube 101 to the surface of the substrate 103 is not limited, as long as the carbon nanotube 101 is transferred to the surface of the substrate 101. In one embodiment, the method for transferring the carbon nanotubes 101 to the surface of the substrate 103 includes the following steps:

S41, providing two tungsten tips, the carbon nanotube 101 is attracted between the two tungsten tips; and
S42, transferring the carbon nanotube 101 to the surface of the substrate 103 using the two tungsten tips.

In the step S41, two tungsten tips are used to lightly touch the two ends of the carbon nanotubes 101, and the carbon nanotubes 101 are adhered to the tungsten tips by the van der Waals force. Since a single carbon nanotube is too thin, it can only be observed under a scanning electron microscope, a transmission electron microscope, etc., but cannot be observed under an optical microscope. In order to facilitate the operation under an optical microscope, before step S41, nanoparticles are formed on the surface of the carbon nanotube 101. Due to the scattering of the nanoparticles, carbon nanotubes with nanoparticles formed on the surface of the carbon nanotubes can be observed under the optical microscope. The material of the nanoparticles is not limited, such as titanium dioxide ($TiO_2$) nanoparticles, sulfur (S) nanoparticles, or the like.

In the step S42, the carbon nanotube 101 attached to the two tungsten tips moves with the gentle movement of the tungsten tip, thereby the carbon nanotube 101 is transferred to the surface of the substrate 103. The carbon nanotube 101 is arranged across the space 1031 of the substrate 103 and is crossed with the second film preform 1024. The carbon nanotube 101 includes a first end, a second end opposite to the first end, and a middle portion located between the first end and the second end. The first end and the second end are contacted with the surface of the substrate 103 respectively. The middle portion of the carbon nanotube 101 is suspended on the space 1031. The middle portion of the carbon nanotube 101 and the middle portion 10243 of the second film preform 1024 are contacted and adhered together by the van der Waals force.

In the step S5, the second film preform 1024 can be cut by a laser to obtain a film 1021 with a predetermined shape. The film 1021 is only hung on the surface of the carbon nanotube 101 and not in direct contact with the substrate 103. In one embodiment, the space of the film 1021 is a rectangle with a width of about 80 micrometers and a length of about 120 micrometers. The width of the film 1021 is the same as the width of the second film preform 1024. The carbon nanotube 101 coincides with the central axis of thin film 1021.

In the step S6, The film 1021 includes a first surface 10211 and a second surface 10212 opposite to the first surface 10211. The first reflecting layer 1022a is located on the first surface 10211, and the second reflecting layer 1022b is located on the second surface 10212. In one embodiment, the aluminum layers are formed on the first surface 10211 and the second surface 10211 respectively by thermal evaporation, and the thickness of the aluminum layer is about 10 nm.

Figure 5:
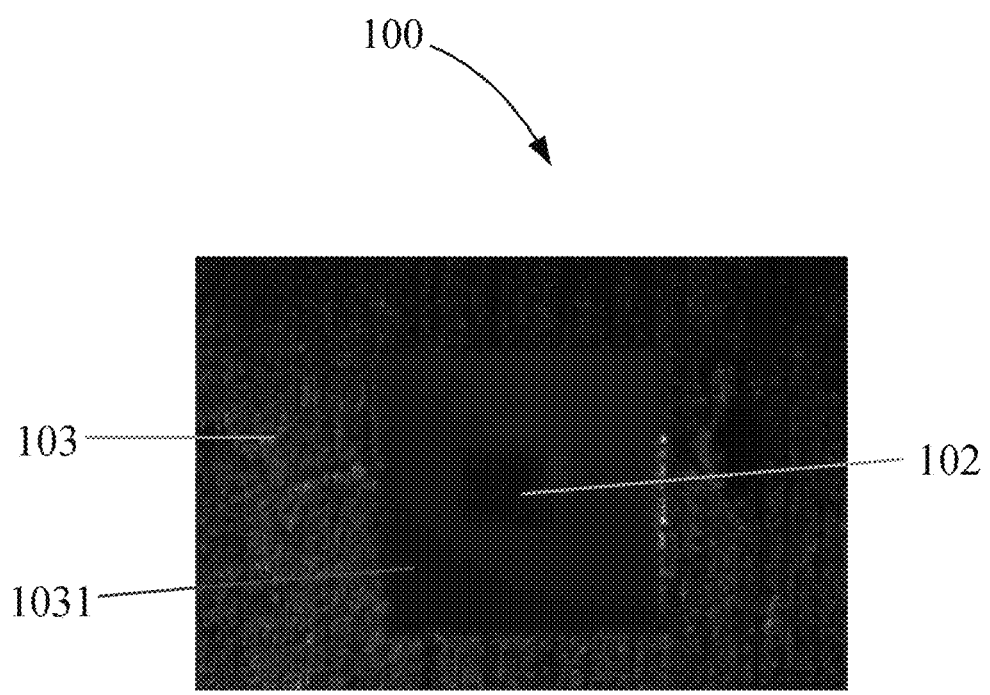
FIG. 5 is an optical microscope photograph of the torsion balance according to one embodiment.

FIG. 5 is an optical microscope photo of the torsion balance 100 in one embodiment of the present disclosure. Since the diameter of the carbon nanotubes is about 7 nanometers, the carbon nanotubes cannot be shown in FIG. 5.

The working principle of the torsion balance 100 is as follows:

providing a laser beam emitted to the surface of the reflector 102, the laser beam is reflected at the reflector 102 and received by the detector at a first position;
applying a micro force to the surface of the reflector to deflect the reflector, the laser beam is received by the detector at a second position;
calculating the magnitude of the micro force according to the first position and the second position.

It can be seen that the value of the micro force is calculated based on the position of the reflected light spot before deflecting the reflector and the position of the reflected light spot after deflecting the reflector.

Figure 6:
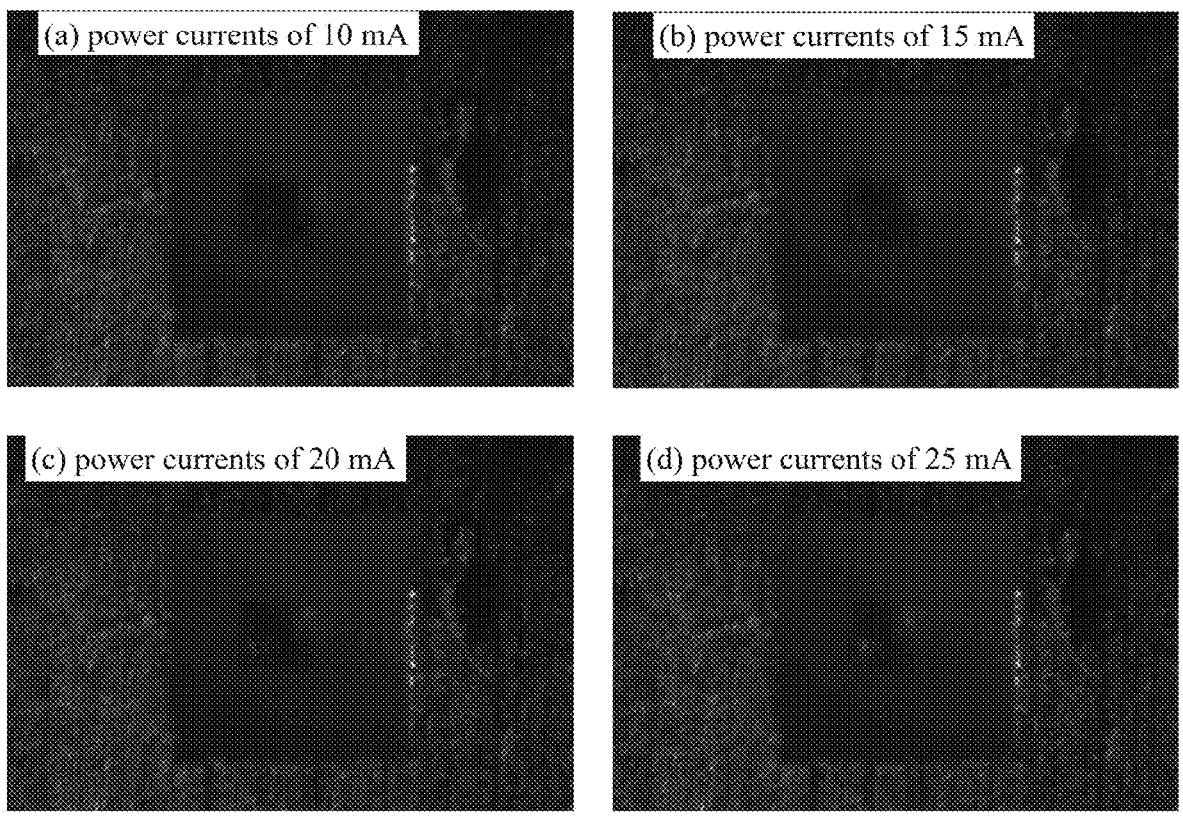
FIG. 6 is an optical microscope photograph of the torsion balance under laser beams with power currents of 10 mA, 15 mA, 20 mA, and 25 mA.

In one embodiment, laser beams with power currents of 10 mA, 15 mA, 20 mA, and 25 mA are used to irradiate the reflector 102, respectively. Photos obtained by an optical microscope are shown in FIG. 6. The reflector 102 is deflected under laser irradiation, and the greater the power of the laser, the greater the deflection angle of the reflector 102. It can be seen that the torsion balance 100 used in this embodiment can respond to the light radiation pressure and twist under the light radiation pressure.

The single carbon nanotube has a nanosized diameter, and the two-dimensional nanomaterial is light in weight and large in surface area, so the two-dimensional nanomaterial has a small moment of inertia. The present disclosure uses a single carbon nanotube as the twisting wire of the torsion balance and uses two-dimensional nanomaterials as the reflector of the torsion balance, which can make the torsion balance have extremely high sensitivity and accuracy, and can be used to measure small force or small torque. The preparation method of the torsion balance provided by present disclosure is simple and easy to operate. In the preparation process, the size of the reflector can be adjusted according to the practical application.

The embodiments shown and described above are only examples. Even though numerous characteristics and advantages of the present technology have been set forth in the forego description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

Depending on the embodiment, certain of the steps of methods described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A torsion balance, comprising:
a twisting wire being a suspended carbon nanotube; and
a reflector hung on the twisting wire, wherein the reflector comprises a film, a first reflecting layer, and a second reflecting layer, and the film comprises a first surface and a second surface opposite to the first surface, and the first reflecting layer is located on the first surface and the second reflecting layer is located on the second surface.

2. The torsion balance of claim 1, wherein the film comprises at least two layers of two-dimensional materials stacked with each other, and the at least two layers of two-dimensional material is a carbon nanotube film, graphene, boron nitride, molybdenum disulfide, tungsten disulfide or any combination thereof.

3. The torsion balance of claim 2, wherein the carbon nanotube film comprises a plurality of first carbon nanotubes combined by van der Waals attractive force therebetween.

4. The torsion balance of claim 2, wherein a number of layers of the two-dimensional material is less than 10.

5. The torsion balance of claim 1, wherein the film is a carbon nanotube-graphene composite film comprising a first drawn carbon nanotube film, a second drawn carbon nanotube film, and a single layered graphene film sandwiched between the first drawn carbon nanotube film and the second drawn carbon nanotube film.

6. The torsion balance of claim 5, wherein the first drawn carbon nanotube film comprises a plurality of first carbon nanotubes, and the second drawn carbon nanotube film comprises a plurality of second carbon nanotubes, an angle between an extending direction of the first carbon nanotubes and an extending direction of the second carbon nanotubes is about 90 degrees.

7. The torsion balance of claim 5, wherein carbon atoms of the single layered graphene film is $sp^3$ hybridized to carbon atoms of the first drawn carbon nanotube film.

8. The torsion balance of claim 1, wherein a material of the first reflecting layer is aluminum, silver, copper, chromium, platinum, or any combination thereof.

9. The torsion balance of claim 1, wherein a thickness of the first reflecting layer is in a range from about 5 nm to about 20 nm.

10. The torsion balance of claim 1, wherein the film is an axisymmetric shaped film, and the carbon nanotube is located on a symmetry axis of the film.

11. The torsion balance of claim 1, wherein the carbon nanotube is prepared by removing an outer wall of a multi-walled carbon nanotube.

12. The torsion balance of claim 1, further comprising a substrate configured to fix and support the carbon nanotube, wherein a space is defined on a surface of the substrate, and the carbon nanotube is arranged across the space.

13. The torsion balance of claim 12, wherein the carbon nanotube comprises a first end, a second end opposite to the first end, and a middle portion located between the first end and the second end; and the first end and the second end are fixed on the surface of the substrate, and the middle portion is suspended on the space.

14. The torsion balance of claim 12, wherein the space is a through hole or a blind hole.

* * * * *